(12) United States Patent
Murillo et al.

(10) Patent No.: US 10,032,314 B2
(45) Date of Patent: Jul. 24, 2018

(54) VIRTUAL REALITY HEADSET

(71) Applicant: Microsoft Technology Licensing, LLC, Redmond, WA (US)

(72) Inventors: Oscar Murillo, Redmond, WA (US); Roger Ibars Martinez, Seattle, WA (US); Jean-Louis Villecroze, Redmond, WA (US); Nema Rao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/290,710

(22) Filed: Oct. 11, 2016

(65) Prior Publication Data

US 2018/0101988 A1    Apr. 12, 2018

(51) Int. Cl.
| | |
|---|---|
| *G09G 5/00* | (2006.01) |
| *G06T 19/00* | (2011.01) |
| *G06F 3/01* | (2006.01) |
| *G02B 27/01* | (2006.01) |
| *G02B 27/00* | (2006.01) |

(52) U.S. Cl.
CPC ........ *G06T 19/006* (2013.01); *G02B 27/0093* (2013.01); *G02B 27/0172* (2013.01); *G06F 3/013* (2013.01); *G02B 2027/014* (2013.01); *G02B 2027/0141* (2013.01)

(58) Field of Classification Search
CPC .............. G06T 19/006; G02B 27/0093; G02B 27/0172; G06F 3/013
USPC ........................................................ 345/633
See application file for complete search history.

(56) References Cited

U.S. PATENT DOCUMENTS

| | | |
|---|---|---|
| 5,900,849 A | 5/1999 | Gallery |
| 9,310,884 B2 | 4/2016 | Benson et al. |
| 2010/0182340 A1 | 7/2010 | Bachelder et al. |
| 2012/0050140 A1 | 3/2012 | Border et al. |
| 2014/0361976 A1 | 12/2014 | Osman et al. |
| 2014/0364212 A1* | 12/2014 | Osman .................. A63F 13/213 463/31 |
| 2015/0049018 A1 | 2/2015 | Gomez |
| 2016/0025978 A1 | 1/2016 | Mallinson |
| 2016/0025982 A1 | 1/2016 | Sutherland et al. |
| 2016/0027212 A1 | 1/2016 | Da Veiga et al. |
| 2016/0027215 A1 | 1/2016 | Burns et al. |
| 2016/0055822 A1 | 2/2016 | Bell |
| 2016/0196694 A1* | 7/2016 | Lindeman .......... G02B 27/0172 345/633 |

OTHER PUBLICATIONS

"Fove", Retrieved on: May 31, 2016 Available at: http://www.getfove.com/.

* cited by examiner

*Primary Examiner* — Ryan R Yang
(74) *Attorney, Agent, or Firm* — Singh Law, PLLC; Ranjeev Singh

(57) ABSTRACT

A virtual reality headset system having a region configured to change its opacity is disclosed. The virtual reality headset system is configured to provide an immersive experience, but also to allow a user to see at least some portion of the outside world, at least some of the time. The headset has a casing that partially surrounds a display. The casing has an opening configured to receive the user's face. The casing has a region between the display and the user's face configured to change a degree of opacity. The region may be a window located in a non-front facing or lateral side of the casing.

19 Claims, 14 Drawing Sheets

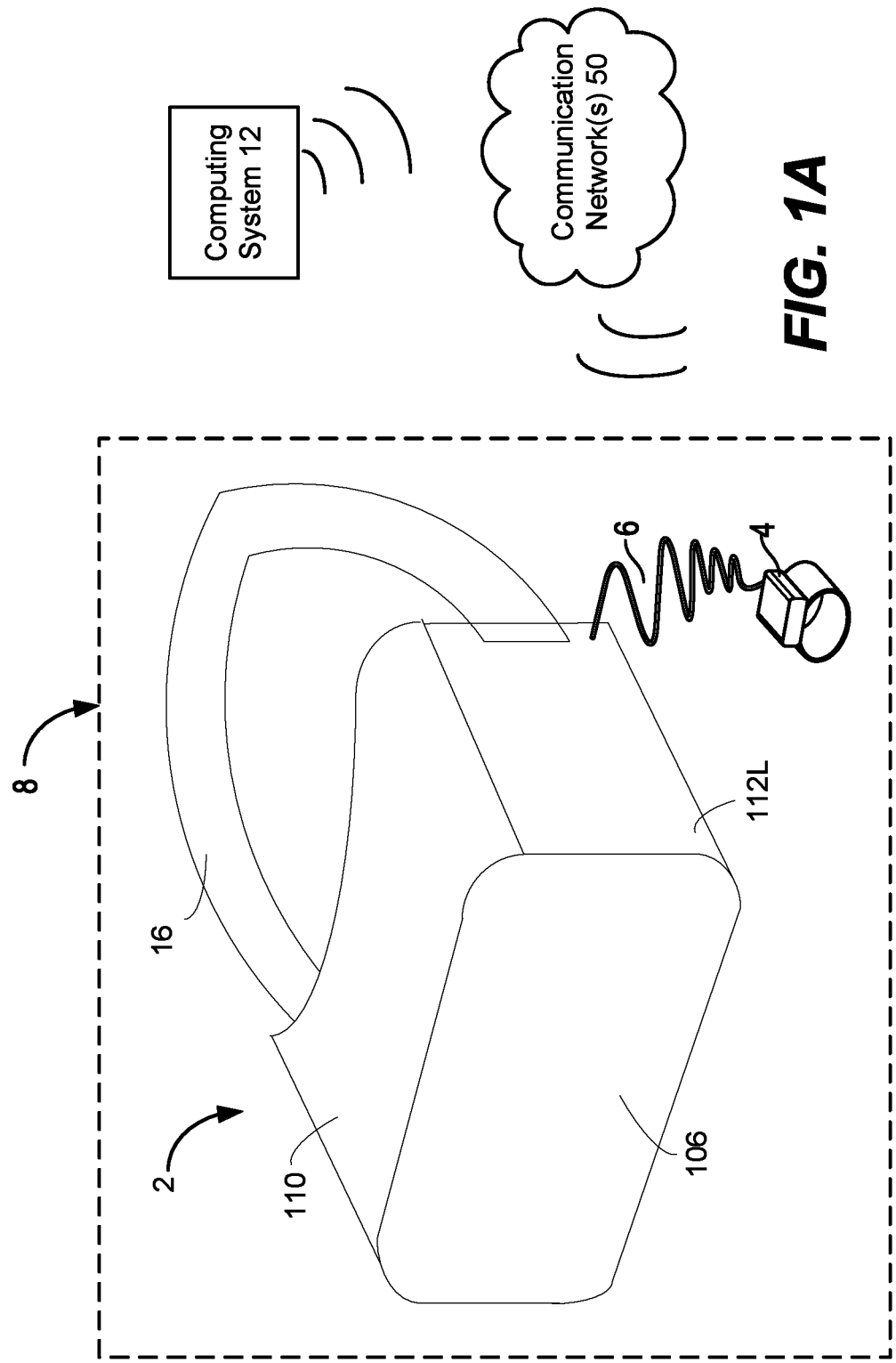

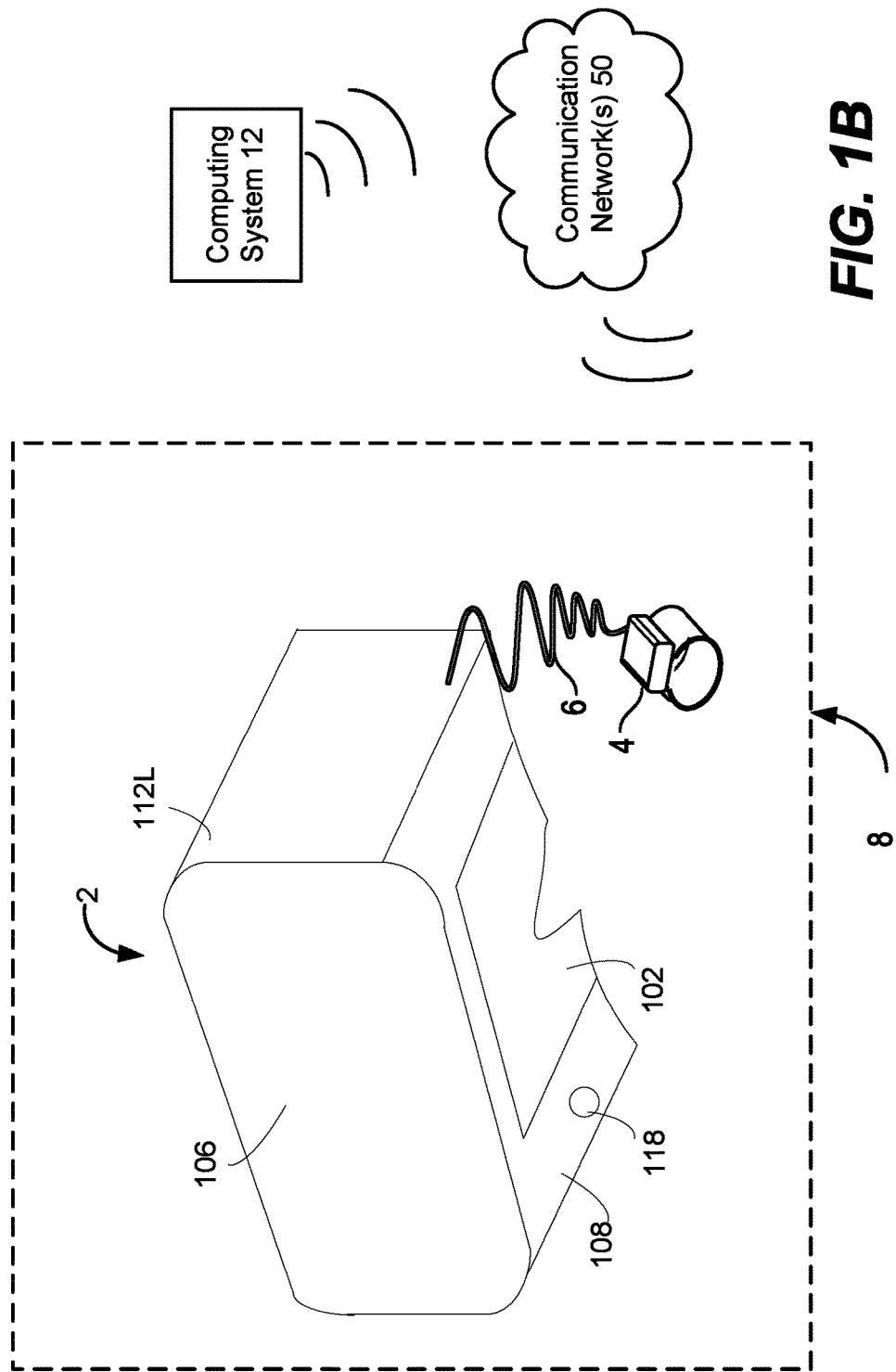

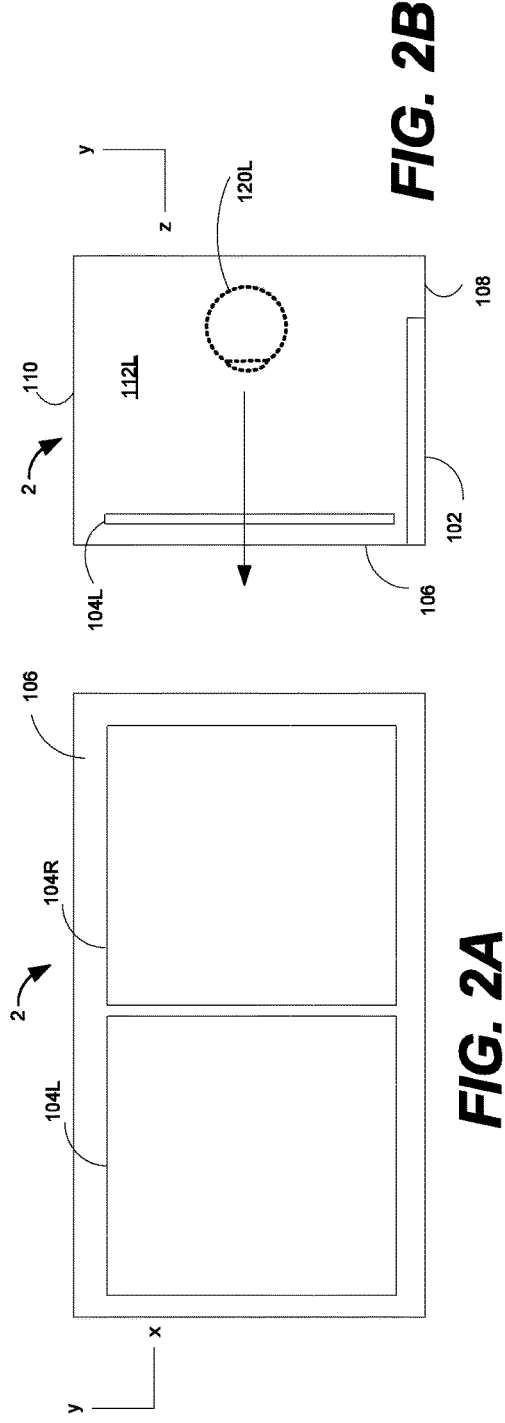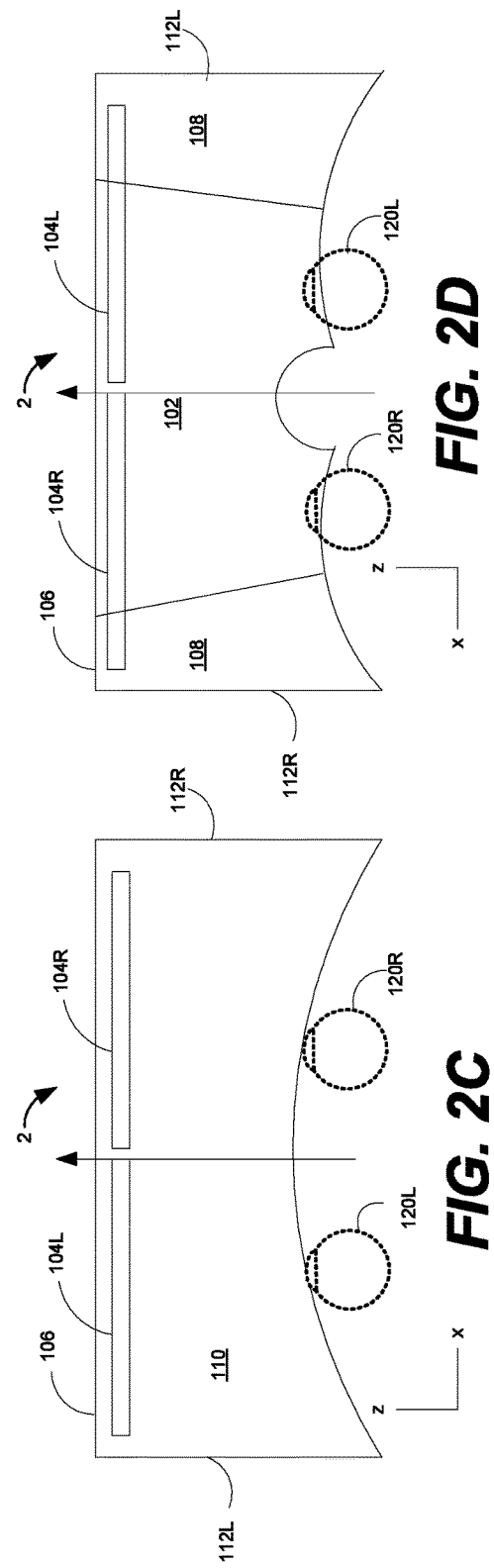

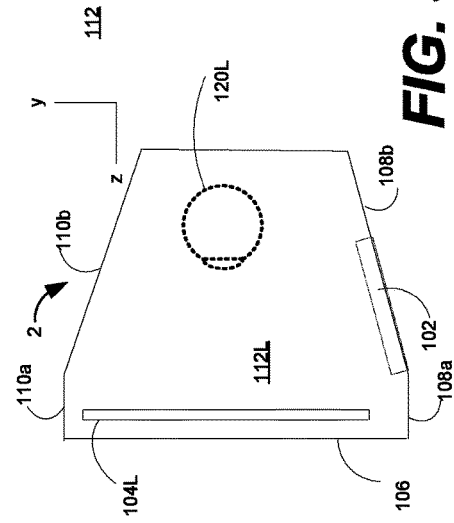
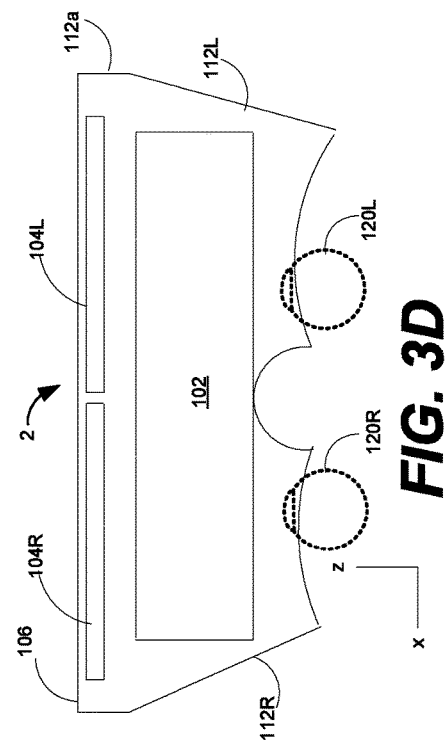
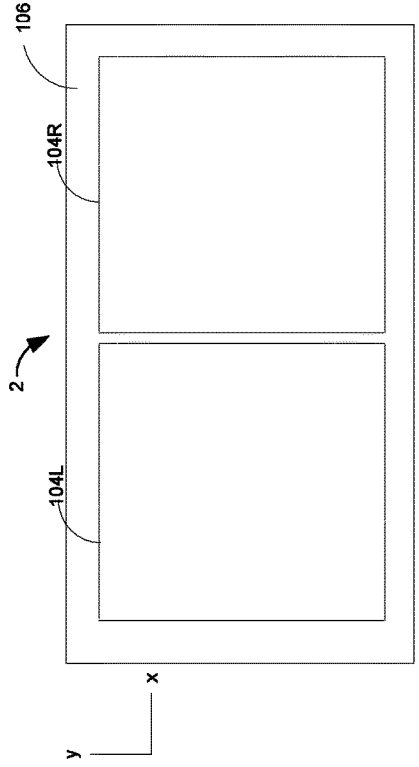
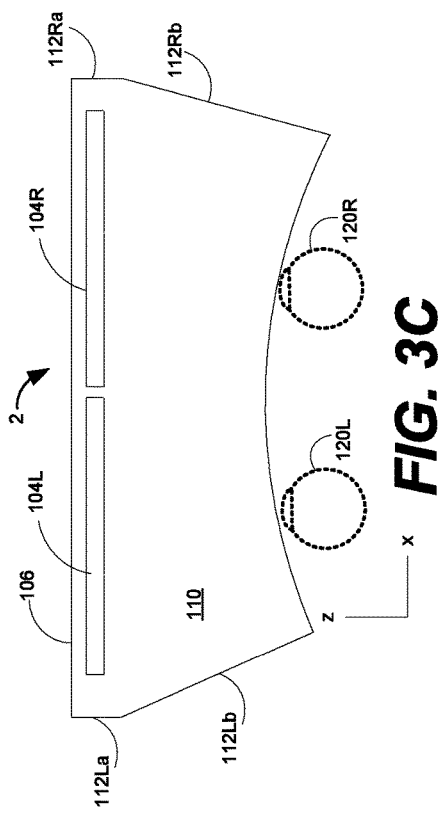

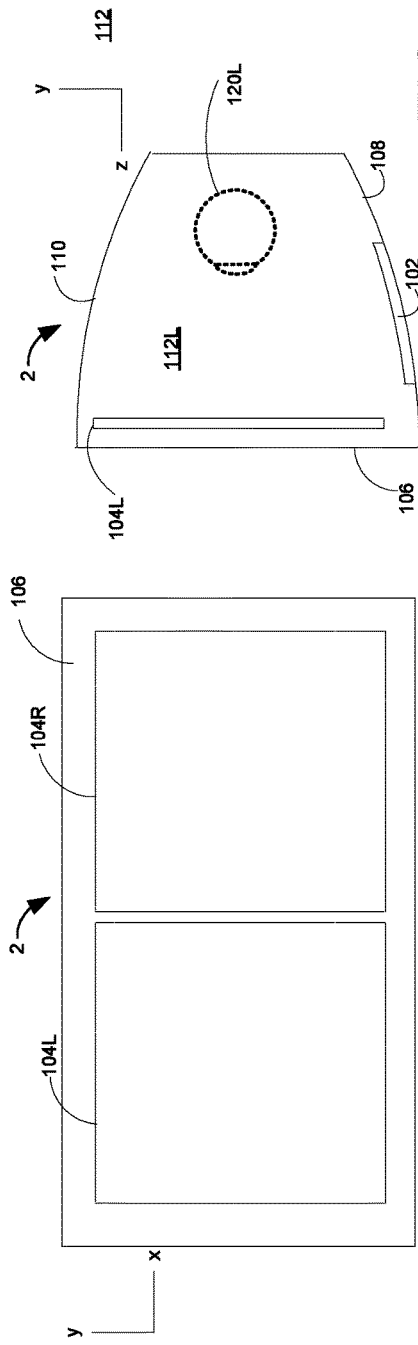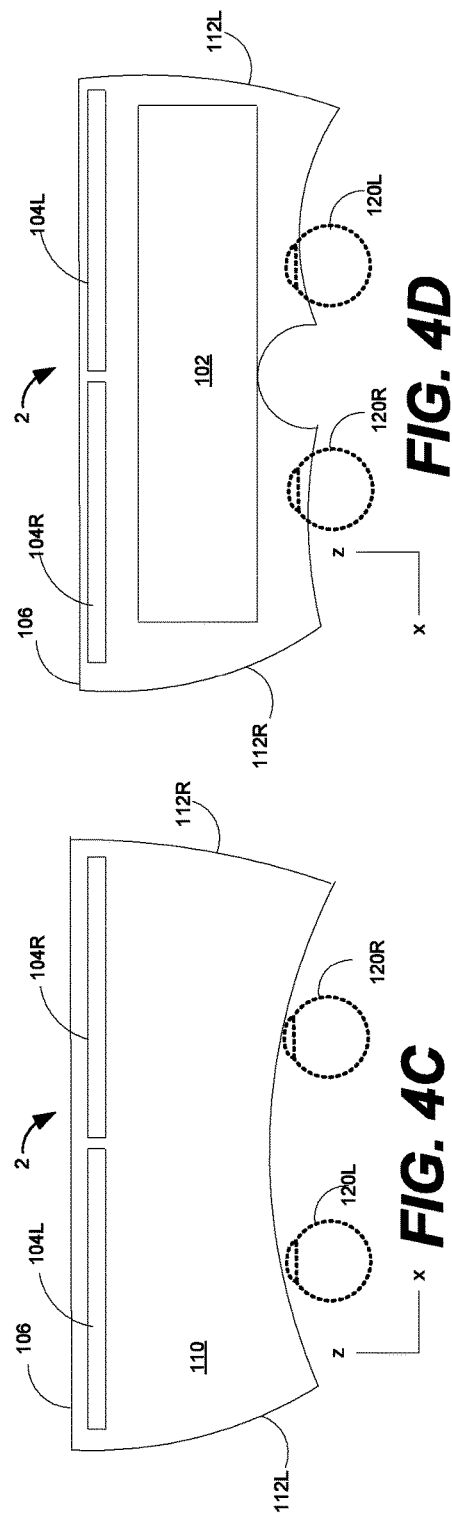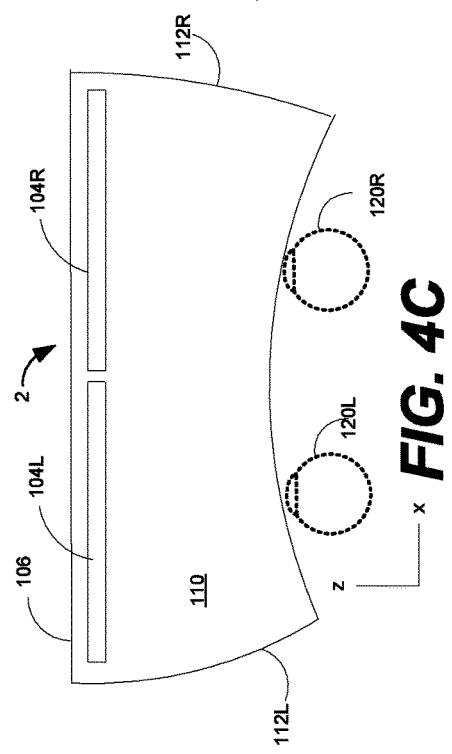

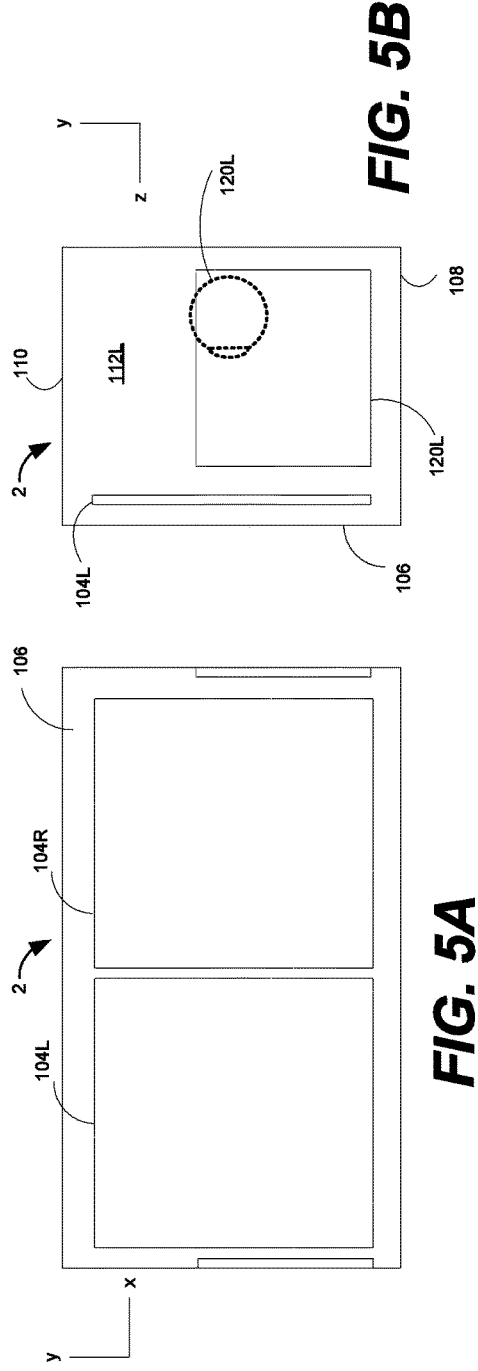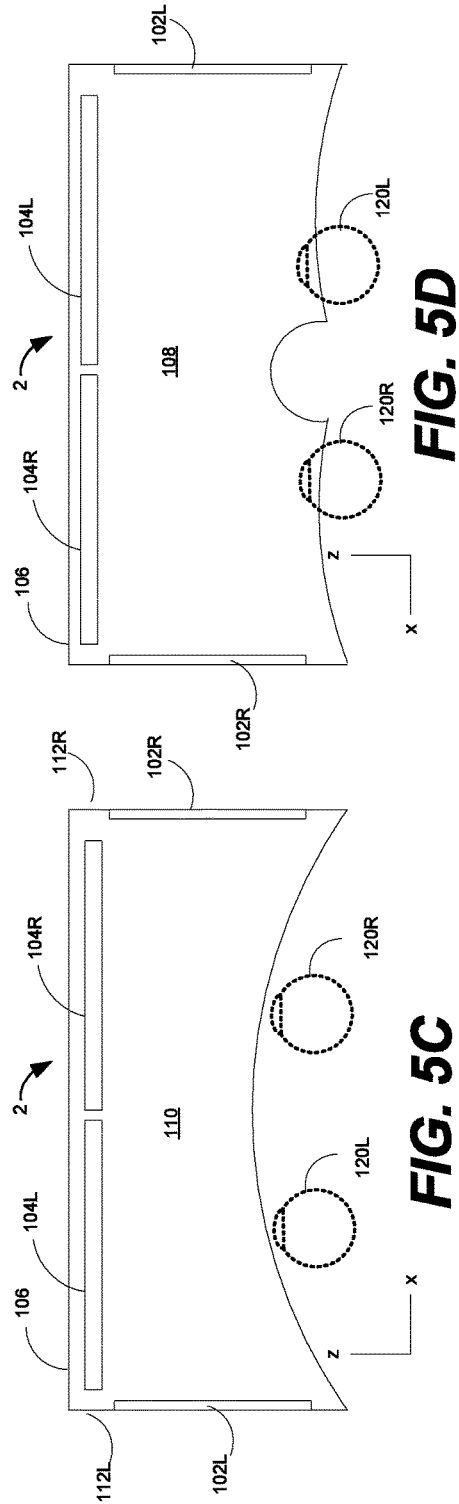

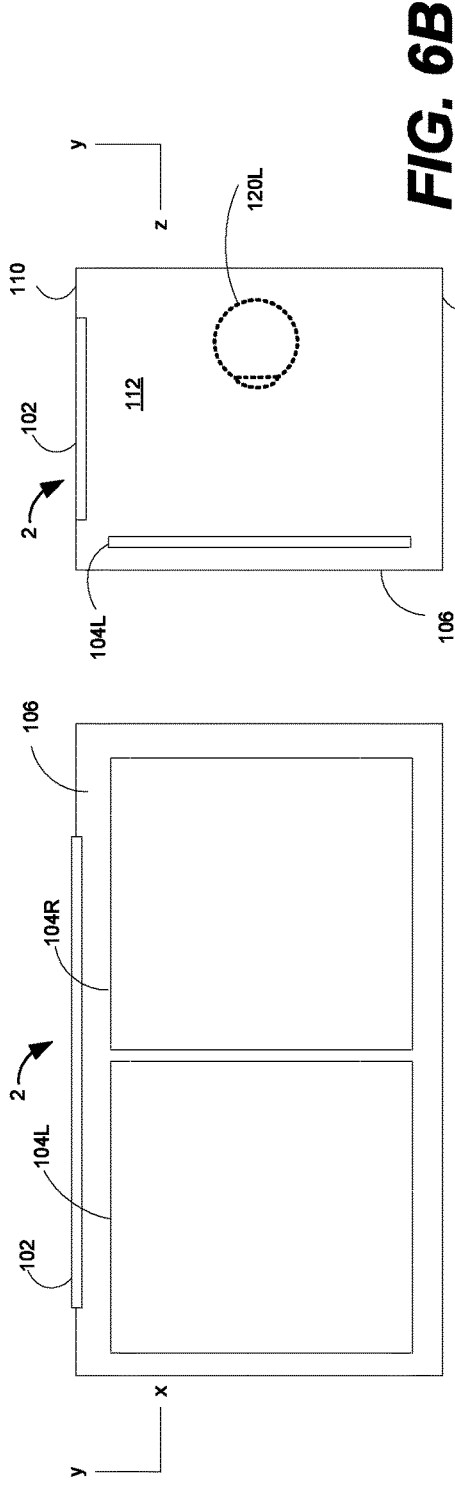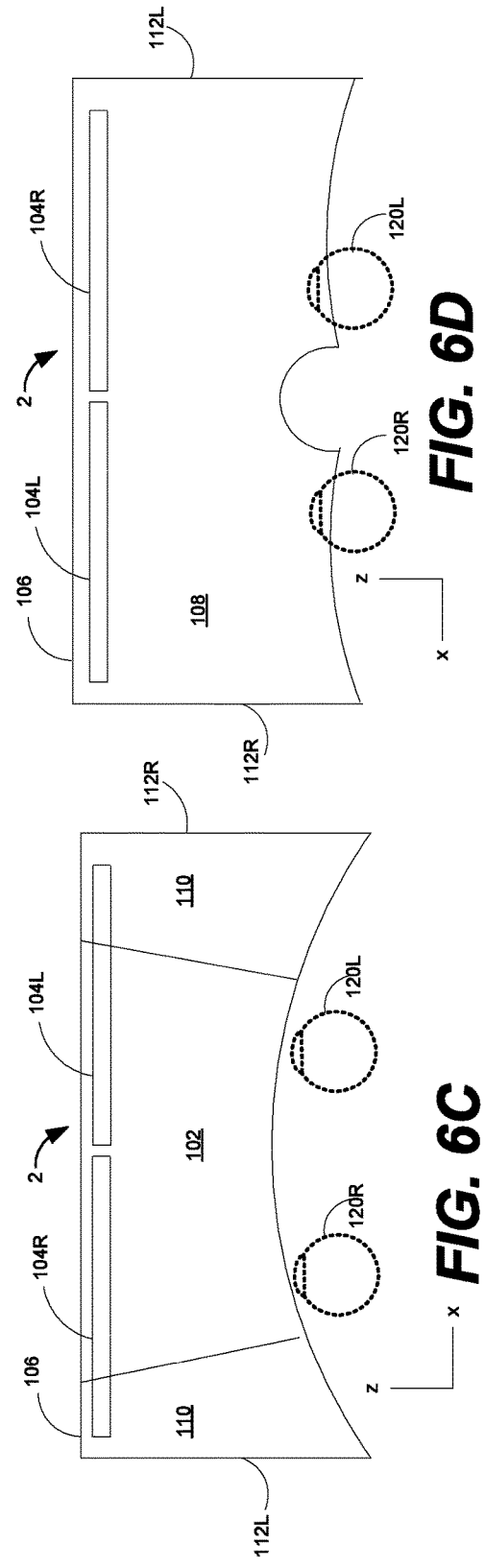

VIRTUAL REALITY HEADSET

BACKGROUND

A virtual reality headset (also referred to as reality display system) provides an immersive experience to a user viewing images on a display while wearing the headset. A virtual reality headset may block the view of the outside or real world from the user in order immerse the user in the images presented by the headset. By blocking the view of the outside world, the user's senses are focused on the images, thereby engaging the user in the experience. This can help to make the experience more realistic.

SUMMARY

Embodiments described herein relate to a virtual reality headset configured to provide an immersive experience, but also to allow a user to see at least some portion of the outside world, at least some of the time. The virtual reality headset may include a window configured to change its opacity. The window may be located in a non-front facing or lateral side of a casing of the virtual reality headset.

One embodiment of virtual reality headset comprises a display configured to present an image to an eye of a user wearing the virtual reality headset and a casing. The casing partially surrounds the display. The casing has an opening configured to receive the user's face. The casing has a region between the display and the user's face configured to change a degree of opacity.

One embodiment is a method comprises the following. An image is presented on a display in a virtual reality headset. The virtual reality headset has a front facing side and one or more non-front facing sides adjoined to the forward facing side. The one or more non-front facing sides form an opening configured to receive the user's face. The display is aligned substantially parallel with the front facing side. A degree of light transmission of a window in at least one of the one or more non-front facing sides is increased while presenting the image. Thus, the user is provided a view of the world outside of the virtual reality headset.

One embodiment is a head mounted display system comprising a processor, a display coupled to the processor, and a casing having a front facing side and one or more lateral sides. The processor is configured to present an image to an eye of a user wearing the head mounted display. The front facing side is substantially aligned with a plane in which the display resides. The one or more lateral sides form an opening configured to receive the user's face. At least one of the one or more lateral sides comprises a window configured to change a degree of light transmission from the world outside of the head mounted display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a diagram depicting example components of one embodiment of a virtual reality headset system.

FIG. 1B is a diagram of a perspective that depicts a bottom surface of one embodiment of the virtual reality headset system of FIG. 1A.

FIGS. 2A-2D depict various views of one embodiment of a virtual reality headset in which the bottom side includes a region that is configured to changes its degree of opacity.

FIGS. 3A-3D depict one embodiment of a virtual reality headset in which the non-front facing sides are not substantially perpendicular to the front facing side.

FIGS. 4A-4D depicted one embodiment of a virtual reality headset in which each non-front facing side has some curvature.

FIGS. 5A-5D depict one embodiment in which a first window resides in the left side and a second window resides in the right side in an embodiment of a virtual reality headset.

FIGS. 6A-6D depict one embodiment in which a window resides in the top side of a virtual reality headset.

DETAILED DESCRIPTION

Figure 1C:
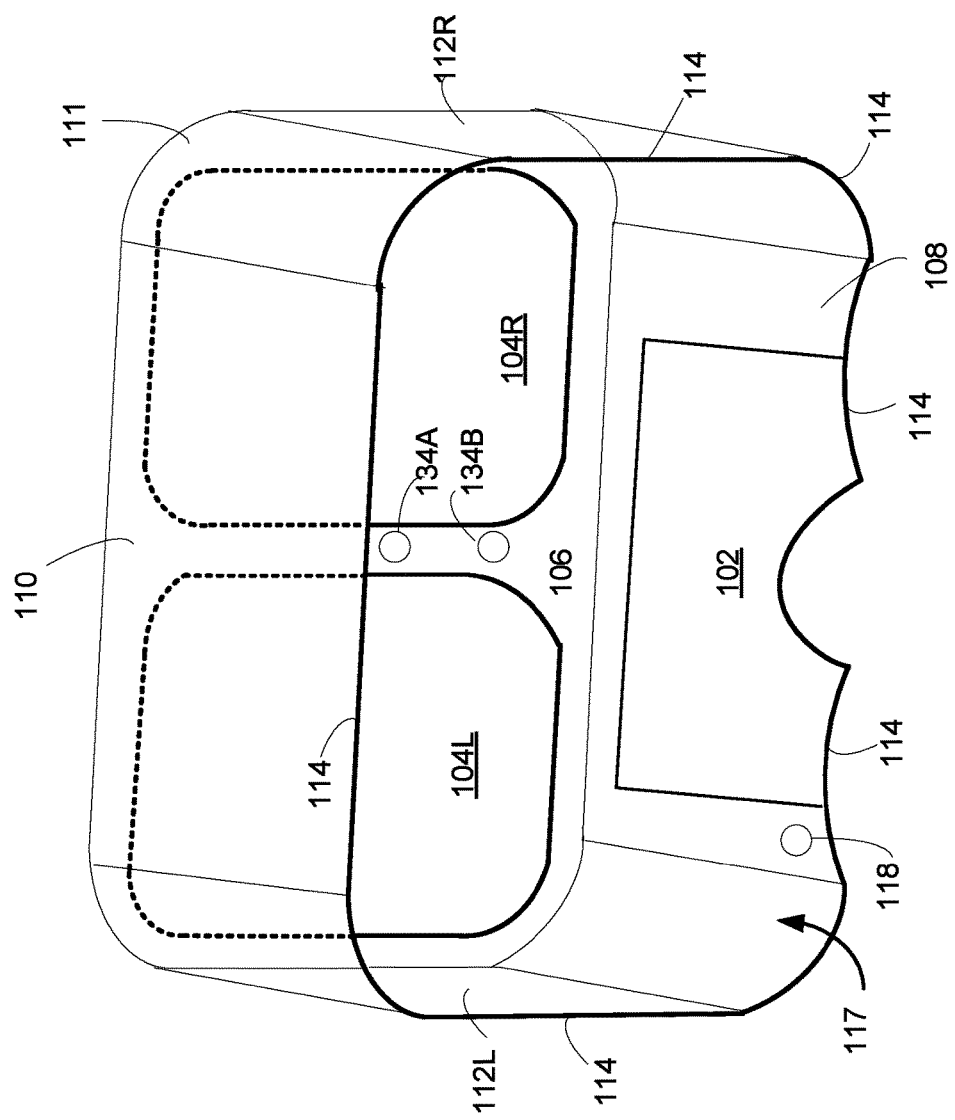
FIG. 1C is a diagram of a perspective that depicts an opening into of one embodiment of the virtual reality headset of FIG. 1A.

Embodiments of the present technology relate to a virtual reality headset system configured to provide an immersive experience, but to also allow a user to see at least some portion of the outside world, at least some of the time. Virtual reality headsets have a wide range of applications including, but not limited to, gaming, workplace, education, and training simulations. For some applications the user may wish to at least briefly focus their attention on something in the real world. For example, a user might wish to enter text on a computer keyboard, keypad, or some other user input device. Taking off the virtual reality headset to see into the real world breaks the immersive experience. Taking off the virtual reality headset can also harm productivity.

One embodiment of a virtual reality headset system has a first mode in which the user is able to clearly see details of objects in the world outside of the virtual reality headset and a second mode in which the user is not able to clearly see details of objects in the world outside of the virtual reality headset. In one embodiment, the first mode is a transparent mode. In one embodiment, the second mode is an opaque mode. In one embodiment, the second mode is a translucent mode. In going from the second mode to the first mode, the virtual reality display may be unchanged such that the impact on the immersive experience is minimized. In one embodiment, the virtual reality headset has a variable opacity window in a non-front facing side of a casing that changes between the first and second modes.

FIG. 1A is a diagram depicting example components of one embodiment of a virtual reality headset system (also referred to as ahead mounted display system). System 8 includes a virtual reality headset 2 in communication with processing unit 4 via wire 6. In other embodiments, virtual reality headset 2 communicates with processing unit 4 via wireless communication. Processing unit 4 may take various embodiments. For example, processing unit 4 may be embodied in a mobile device like a smart phone, tablet or laptop computer. In some embodiments, processing unit 4 is a separate unit which may be worn on the user's body, e.g. the wrist in the illustrated example or in a pocket, and includes much of the computing power used to operate virtual reality headset 2. Processing unit 4 may communicate wirelessly (e.g., WiFi, Bluetooth, infrared, RFID transmission, wireless Universal Serial Bus (WUSB), cellular, 3G, 4G or other wireless communication means) over a communication network 50 to one or more hub computing systems 12 whether located nearby in this example or at a remote location. In other embodiments, the functionality of the processing unit 4 may be integrated in software and hardware components of the virtual reality headset 2.

Virtual reality headset 2 is worn on the head of a user so that the user can see the display while blocking out the real world. In the depicted embodiment, strap 16 allows the virtual reality headset 2 to fit securely to the user's head. The virtual reality headset 2 has a casing comprising a front facing side 106, and one or more non-front facing sides, in some embodiments. In some embodiments, the casing is made of plastic, or at least primarily of plastic. FIG. 1A depicts a top side 110 and a left side 112L, each of which adjoin the front facing side 106, in this embodiment. The front side 106 may also be referred to as a forward facing side. The front (or forward facing) side 106 faces the direction in which the user naturally looks when wearing the virtual reality headset 2. Thus, the front (or forward facing) side 106 is to the front of the user wearing the virtual reality headset 2. Stated another way, the front (or forward facing) side 106 is in the direction of the user looking forward when wearing the virtual reality headset 2.

Although not depicted in FIG. 1A, there may be a right side and a bottom side of the casing. FIG. 1B depicts the virtual reality headset 2 of FIG. 1A from a perspective to show the bottom side 108 (the strap 16 is not depicted so as to not obscure the diagram).

The casing may aid in providing an immersive experience by blocking the user's view of the world outside of the virtual reality headset, at least some of the time. In one embodiment, at least one of the non-front facing sides is configured to change its degree of opacity in order to change the extent to which the user can clearly see the world outside of the virtual reality headset. In other words, at least one of the non-front facing sides is configured to change the degree to which light is transmitted from the world outside of the virtual reality headset in order to allow the user to see details of objects in the world outside. In one embodiment, the degree of opacity is changed between transparent and opaque. In one embodiment, the degree of opacity is changed between transparent and translucent.

In FIG. 1B, the bottom side 108 includes a region 102 (e.g., window) that is configured to changes its degree of opacity. FIG. 1C depicts the virtual reality headset 2 of FIGS. 1A and 1B from a perspective of the user looking into the virtual reality headset 2. More particularly, FIG. 1C depicts the casing and display 104. In some embodiments, the front side 106 serves as a base into which the display 104 is mounted. The casing has an opening 117 that allows the user to see into the virtual reality headset 2. The casing has front side 106, left side 112L, top side 110, right side 112R, and bottom side 108. The non-front facing sides 108, 110, 112L, 112R may also be referred to as lateral sides. A corner 111 region is also referenced. A portion of the corner region 111 may be considered to be part of the right side 112R, and another portion the part of the top side 110. Edges 114 of the non-front facing sides 108, 110, 112L, 112R may be placed against the user's face such that the user's view of the world outside of the virtual reality headset 2 may be blocked (at least when the window 102 obscures the user's view).

The casing may be configured to provide a shield between the outer edges of the display 104 and the user's face to block the world outside of the virtual reality headset. However, note that the degree of opacity of the window 102 may be changed in order to selectively provide the user with a view into at least some portion of the world outside of the virtual reality headset 2.

The window 102 is in a portion of the casing between the display 104 and the user's face. Stated another way, the window 102 is in a portion of the casing between the display 104 and the edges 114. The window 102 could be in a different portion of the casing between the display 104 and the edges 114, such as left side 112L, top side 110, or right side 112R. Note that the window 102 is not required to be entirely within the portion of the casing between the display 104 and the user's face. For example, a portion of the window 102 could reside in the front surface 106.

A right display 104R and a left display 104L can be seen. In some embodiments, the display 104 is separated into a right display 104R and a left display 104L, such that a stereoscopic image may be presented. For example, right display 104R may present an image to the user's right eye, and left display 104R may present an image to the user's left eye. However, the display 104 is not required to present stereoscopic images. Also, the display can be formed from one single physical display screen instead of two separate screens. Herein, when the right or left display is specifically being referred to, the references "104R" or "104L" will be used, respectively. When referring to the display in general (whether it has a separate left and right display), the reference "104" will be used. A variety of technologies may be used to implement the display 104. In one embodiment, the display 104 is an LCD screen (or two LCD screens for stereoscopic vision).

In some embodiments, the window 102 is configured to change its degree of opacity in response to an electrical signal (e.g., voltage). In such embodiments, the window 102 may have electrodes for applying the electrical signal.

The virtual reality headset 2 in FIGS. 1B and 1C depicts a sensor 118 on the bottom side. In some embodiments, the sensor 118 is used to detect user activity upon which the virtual reality headset 2 changes the opacity of the window 102. This change could increase or decrease the opacity. In one embodiment, the sensor 118 includes a camera. The camera could be an RGB camera, IR camera, etc. In one embodiment, the sensor 118 includes a capacitive sensor that allows the user to provide input by touch. For example, the user can tap the capacitive sensor, make a swiping motion on the capacitive sensor, etc. to change the opacity of the window. In one embodiment, the sensor 118 includes an audio microphone. Thus, the virtual reality headset 2 can change the opacity of the window 102 in response to the user's voice. Note that the sensor 118 can include more than one of the foregoing options. Also, other types of sensors could be used. In some embodiments, the sensor 118 can be located on the window 102 itself. The sensor 118 could be located elsewhere than the bottom side 108.

The virtual reality headset 2 in FIG. 1C depicts an eye tracking illumination unit 134A and an eye tracking sensor 134B. Together, 134A and 134B may be referred to as an eye tracking camera 134. The eye tracking camera 134 operates in the infrared (IR) region, in some embodiments. In some embodiments, the eye tracking sensor 134B may be an IR camera or an IR position sensitive detector (PSD) for tracking glint positions. From IR reflections, the position of the pupil within the eye socket can be identified by known imaging techniques when the eye tracking sensor 134B is an IR camera, and by glint position data when the eye tracking sensor 134B is a type of position sensitive detector (PSD). The use of other types of eye tracking sensors and other techniques for eye tracking are also possible. In some embodiments, the virtual reality headset system 8 changes the opacity of the window 102 based on tracking the user's eye gaze. For example, the opacity may be decreased in response to detecting that the user is gazing at the window 102 for a pre-determined time.

The window 102 comprises an electrochromic material in one embodiment. The electrochromic material changes light transmission properties (e.g., opacity) in response to voltage and thus allows control over the amount of light passing through. For example, the window 102 may change between a translucent state and a transparent state.

The window 102 is a polymer dispersed liquid crystal device (PDLCs), in one embodiment. With no voltage applied to the electrodes, the liquid crystals are randomly arranged in droplets, resulting in scattering of light as it passes through the window 102. This may result in a translucent, "milky white" appearance. When a voltage is applied to the electrodes, an electric field causes the liquid crystals to align, allowing light to pass through the window 102 with very little scattering, thereby resulting in a transparent state. Thus, the degree of opacity can be controlled by the applied voltage.

In one embodiment, the window 102 has a thin coating of nanocrystals embedded in glass in order to provide selective control over visible light. A small jolt of electricity can switch the material between transmitting and blocking states. Thus, the degree of opacity can be controlled by the applied voltage.

In one embodiment, the window 102 includes a dense grid of pixels, where the light transmissivity of each pixel is individually controllable between minimum and maximum transmissivities. The transmissivity could range between 0 to 100%, but such a wide range is not required. As an example, the window 102 could include monochrome LCD panel with one or more polarizing filters.

FIGS. 2A-2D depict various views of one embodiment of a virtual reality headset 2 in which the bottom side 108 includes a region 102 (e.g., window) that is configured to changes its degree of opacity. FIG. 2A depicts a front side 106. FIG. 2B depicts a left side 112L. FIG. 2C depicts a top side 110. FIG. 2D depicts a bottom side 108. Note that FIG. 2B depicts a left side. The right side may be similar in configuration to the left. That is, typically the left and right sides are symmetric (although symmetry is not always required). Thus, the discussion with respect to the left side of FIG. 2B also applies to the right side. In one embodiment, each of the sides 106, 108, 110, 112R, 112L may be substantially planar, but it is not required that the sides be planar.

The front side 106 may also be referred to as a forward facing side. The front (or forward facing) side 106 faces the direction in which the user naturally looks looking at the display 104. FIGS. 2B-2C each show an arrow to depict a general direction in which the user look to view the display 104. Thus, the front (or forward facing) side 106 is to the front of the user wearing the virtual reality headset. Stated another way, the front (or forward facing) side 106 is in the direction of the user looking forward when wearing the virtual reality headset 2.

The virtual reality headset 2 has a display 104 configured to present an image to an eye 120 of a user wearing the virtual reality headset. In some embodiments, the right display 104R may present an image to the user's right eye 120R, and left display 104R may present an image to the user's left eye 120L. However, the display 104 is not required to present stereoscopic images. Also, the display can be formed from one single physical display screen instead of two separate screens.

In one embodiment, the display 104 is aligned substantially parallel with the front side 110. For example, right display 104R and left display 104L may be substantially parallel with front facing side 106. The non-front facing sides are substantially perpendicular to the front facing side 106, in one embodiment. For example, in the embodiment of FIGS. 2A-2D, left side 112L is substantially perpendicular to front facing side 106; top side 110 is substantially perpendicular to front facing side 106; and bottom side 108 is substantially perpendicular to front facing side 106. By "substantially perpendicular" in this context it is meant that there may be a few degrees (e.g., 5 degrees) variance from 90 degrees. In some embodiments, the window 102 has a major surface that is angled at least 30 degrees with respect to a major surface of the display 104.

A non-front facing side, as defined herein, means a region of the casing that is angled at least 30 degrees with respect to the plane that is perpendicular to the user's direct line of sight. By the definition used herein, the user's direct line of sight is depicted by the arrows in FIGS. 2B-2D. In the example of FIGS. 2A-2D, the front surface is in the plane that is perpendicular to the user's direct line of sight, but that is not required. By the definition used herein the maximum angle between two planes is 90 degrees.

FIGS. 3A-3D depict one embodiment of a virtual reality headset in which the non-front facing sides 108, 110, 112L, 112R are not substantially perpendicular to the front facing side 106. Since the window 102 is in the bottom side 108, the major surface of the window 102 is not perpendicular to the major surface of the display 104. However, the major surface of the window 102 is angled at greater than 30 degrees with respect to the major surface of the display 104. Likewise, the major surface of the window 102 is angled at greater than 30 degrees with respect to the plane perpendicular to the user's light of sight. In FIGS. 3A-3D this plane is parallel to the front side 106, but that is not a requirement.

The non-front facing sides can have a variety of shapes. In the embodiment depicted in FIG. 2A-2D, the non-front facing sides 108, 110, 112R, 112L are each comprise one planar portion. In the embodiment depicted in FIG. 3A-3D, each non-front facing side 108, 110, 112L, 112R has two substantially planar portions. For example, top side 110 has first top planar portion 110a and second top planar portion 110b, bottom side 108 has first bottom planar portion 108a and second bottom planar portion 108b, left side 112L has first left side planar portion 112La and second left side planar portion 112Lb, and right side 112R has first right side planar portion 112Ra and second right side planar portion 112Rb.

In the embodiment depicted in FIG. 3D, the window 102 resides completely within second bottom planar portion 108*b*. The window 102 could instead reside completely within first bottom planar portion 108*a*. The window 102 could reside partially in each of first bottom planar portion 108*a* and second bottom planar portion 108*b*.

An alternative to the embodiment of FIGS. 3A-3D is to eliminate one or more of the first bottom planar portion 108*a*, first top planar portion 110*a*, and/or first side planar portion 112*a*. For example, with the first bottom planar portion 108*a* eliminated, the second bottom planar portion 108*b* is directed adjoined to the front facing side 106.

The non-front facing sides 108, 110, 112L, 112R are not required to be planar. FIGS. 4A-4D depicted one embodiment of a virtual reality headset 2 in which each non-front facing side 108, 110, 112L, 112R has some curvature. In this embodiment, each side 108, 110, 112L, 112R curves "outward" or is convex. Alternatively, one or more of the non-front facing side 108, 110, 112L, 112R may curve "inward" or be concave. In the embodiment of FIGS. 4A-4D depicted, the window 102 is in the bottom side 108 and has some amount of curvature.

Note that all portions of the major surface of the window 102 are angled at greater than 30 degrees with respect to the major surface of the display 104. Likewise, the major surface of the window 102 is angled at greater than 30 degrees with respect to the plane perpendicular to the user's light of sight. In FIGS. 4A-4D this plane is parallel to the front side 106, but that is not a requirement.

Note that it is possible for no part of any of the non-front facing side 108, 110, 112R, 112L to be planar. For example, the non-front facing side could be shaped like a cylinder or cone. In this case, the casing could be considered to have a single non-front facing side. However, note that such a non-front facing side has bottom portion, a top portion, a left side portion, and a right side portion.

Also, note that although in some embodiments the casing has clearly defined edges between multiple non-front facing side 108, 110, 112R, 112L, such edges are not required. The casing can have a cylinder or cone shape in which there are no clearly defined edges in the general direction parallel to the user's line of sight.

A non-front facing side 108, 110, 112L, 112R may have combinations of properties depicted in FIGS. 2A-2D, 3A-3D, and/or 4A-4D. For example, a non-front facing side 108, 110, 112L, 112R could have one or more planar regions and one or more curved regions. The window 102 may be located anywhere in any of the non-front facing side 108, 110, 112.

The window 102 may reside in any of the non-front facing sides 108, 110, 112R, 112L. FIGS. 5A-5D depict one embodiment in which a first window 102L resides in the left side 112L and a second window 102R resides in the right side 112R. FIGS. 6A-6D depict one embodiment in which a window 102 resides in the top side 110.

Figure 7A:
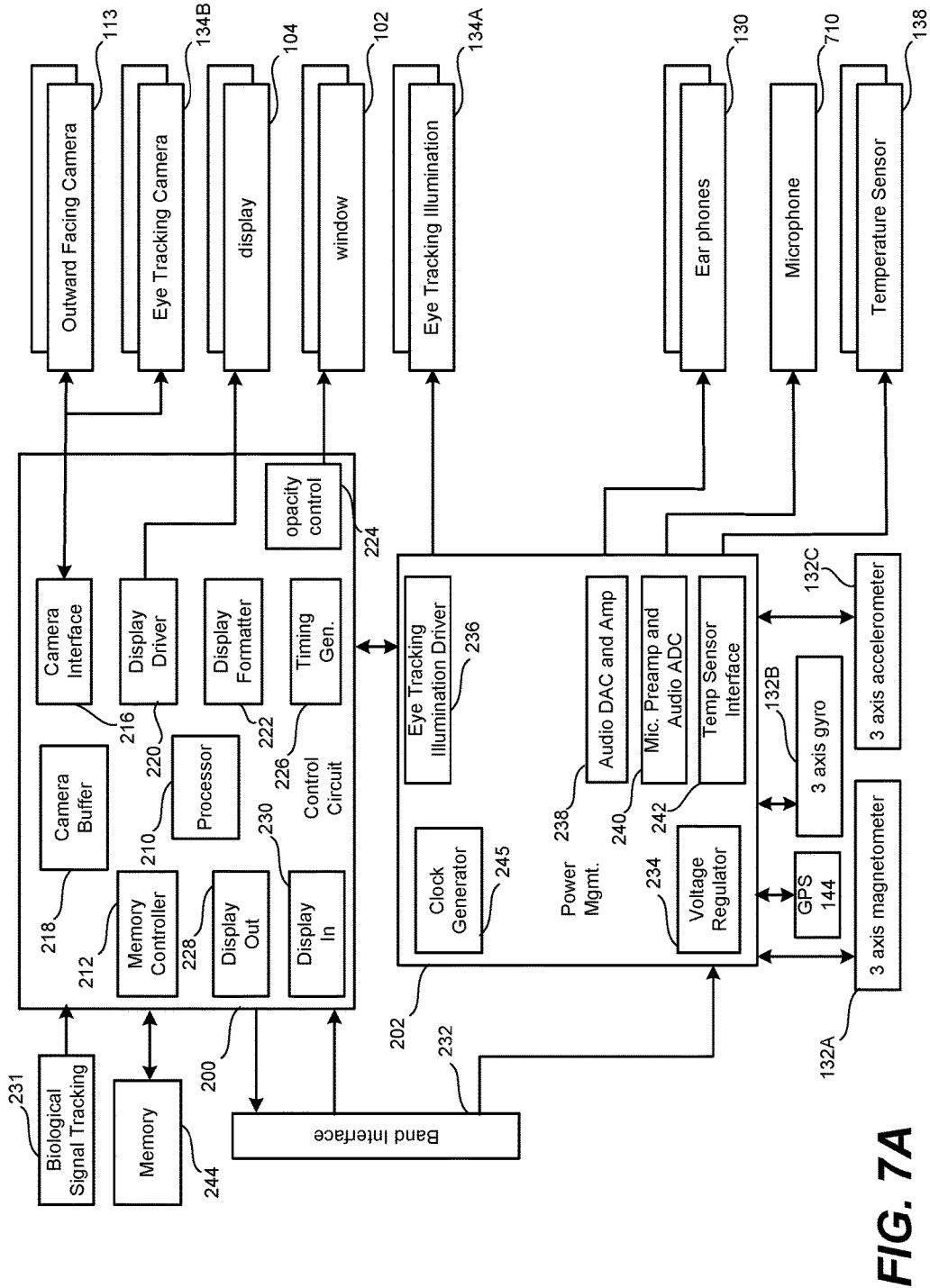
FIG. 7A is a block diagram of one embodiment of hardware and software components of a see-through, near-eye, mixed reality display device as may be used with one or more embodiments.
Figure 7B:
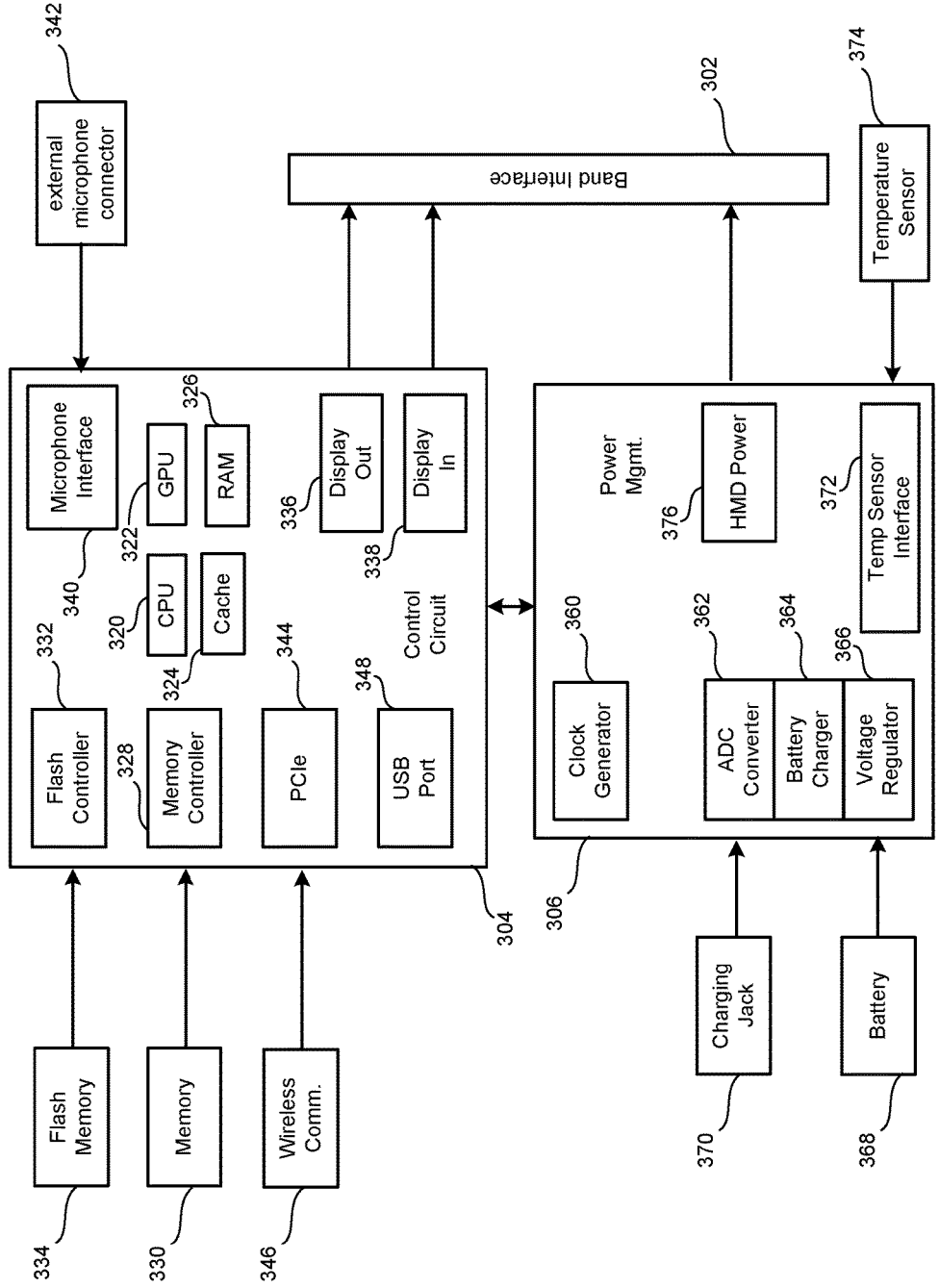
FIG. 7B is a block diagram describing the various components of a processing unit.

FIG. 7A is a block diagram of one embodiment of hardware and software components of a virtual reality headset 2 as may be used with one or more embodiments. FIG. 7B is a block diagram describing the various components of a processing unit 4. In this embodiment, virtual reality headset 2, receives instructions about a virtual image from processing unit 4 and provides data from sensors back to processing unit 4. Software and hardware components which may be embodied in a processing unit 4, for example as depicted in FIG. 7B, receive the sensory data from the virtual reality headset 2 and may also receive sensory information from a computing system 12 over a network 50.

Based on that information, processing unit 4 will determine where and when to provide a virtual image to the user and send instructions accordingly to the control circuitry 136 of the virtual reality headset 2.

Note that some of the components of FIG. 7A (e.g., outward or physical environment facing camera 113, eye camera 134, display 104, window 102, eye tracking illumination unit 134A, earphones 130, and temperature sensor 138) are shown in shadow to indicate that there can be at least two of each of those devices, at least one for the left side and at least one for the right side of virtual reality headset 2. In one embodiment, the eye tracking illumination source 134A may include one or more infrared (IR) emitters such as an infrared light emitting diode (LED) or a laser (e.g. VCSEL) emitting about a predetermined IR wavelength or a range of wavelengths.

FIG. 7A shows the control circuit 200 in communication with the power management circuit 202. Control circuit 200 includes processor 210, memory controller 212 in communication with memory 244 (e.g., D-RAM), camera interface 216, camera buffer 218, display driver 220, display formatter 222, timing generator 226, display out interface 228, and display in interface 230. In one embodiment, all of components of control circuit 200 are in communication with each other via dedicated lines of one or more buses. In another embodiment, each of the components of control circuit 200 is in communication with processor 210.

Camera interface 216 provides an interface to the two physical environment facing cameras 113 and, in this embodiment, an IR camera as sensor 134B and stores respective images received from the cameras 113, 134B in camera buffer 218. In some embodiments, the eye tracking IR sensor 134B may be an IR camera or an IR position sensitive detector (PSD) for tracking glint positions. From IR reflections, the position of the pupil within the eye socket can be identified by known imaging techniques when the eye tracking IR sensor 134B is an IR camera, and by glint position data when the eye tracking IR sensor 134B is a type of position sensitive detector (PSD). The use of other types of eye tracking IR sensors and other techniques for eye tracking are also possible and within the scope of an embodiment.

Display driver 220 will drive display 104. Display formatter 222 may provide information, about the virtual image being displayed on display 104 to one or more processors of one or more computer systems, e.g. 4 and 12 performing processing for the virtual reality system. Timing generator 226 is used to provide timing data for the system. Display out interface 228 includes a buffer for providing images from physical environment facing cameras 113 and the eye cameras 134B to the processing unit 4. Display in interface 230 includes a buffer for receiving images such as a virtual image to be displayed on display 104. Display out 228 and display in 230 communicate with band interface 232 which is an interface to processing unit 4. Opacity control 224 is used to change the degree of opacity of the window 102. There may be one or more windows 102.

Biological signal tracking 231 is used to track one or more biological signals of the user. In one embodiment, biological signal tracking 231 includes a blood pressure monitor. In one embodiment, biological signal tracking 231 includes a heart rate monitor.

Power management circuit 202 includes voltage regulator 234, eye tracking illumination driver 236, audio DAC and amplifier 238, microphone preamplifier and audio ADC 240, temperature sensor interface 242, and clock generator 245. Voltage regulator 234 receives power from processing unit 4 via band interface 232 and provides that power to the other components of virtual reality headset 2. Illumination driver 236 controls, for example via a drive current or voltage, the eye tracking illumination unit 134A to operate about a predetermined wavelength or within a wavelength range. Audio DAC and amplifier 238 provides audio data to earphones 130. Microphone preamplifier and audio ADC 240 provides an interface for microphone 710. Temperature sensor interface 242 is an interface for temperature sensor 138. Active filter controller 237 receives data indicating one or more wavelengths for which each wavelength selective filter 127 is to act as a selective wavelength filter. Power management unit 202 also provides power and receives data back from three axis magnetometer 132A, three axis gyroscope 132B and three axis accelerometer 132C. Power management unit 202 also provides power and receives data back from and sends data to GPS transceiver 144.

FIG. 7B is a block diagram of one embodiment of the hardware and software components of a processing unit 4 associated with a virtual reality headset 2. FIG. 7B shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with virtual reality headset 2 via band interface 302 and band interface 232, display in buffer 338 in communication with virtual reality headset 2 via band interface 302 and band interface 232, microphone interface 340 in communication with an external microphone connector 342 for connecting to a microphone, PCI express interface 344 for connecting to a wireless communication device 346, and USB port(s) 348.

In one embodiment, wireless communication component 346 can include a Wi-Fi enabled communication device, Bluetooth communication device, infrared communication device, cellular, 3G, 4G communication devices, wireless USB (WUSB) communication device, RFID communication device etc. The wireless communication component 346 thus allows peer-to-peer data transfers with for example, another system 8, as well as connection to a larger network via a wireless router or cell tower. The USB port can be used to dock the processing unit 4 to another system 8. Additionally, the processing unit 4 can dock to another computing system 12 in order to load data or software onto processing unit 4 as well as charge the processing unit 4. In one embodiment, CPU 320 and GPU 322 are the main workhorses for determining where, when and how to insert virtual images into the view of the user.

Power management circuit 306 includes clock generator 360, analog to digital converter 362, battery charger 364, voltage regulator 366, head mounted display (HMD) power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 provides power to the virtual reality headset 2.

Figure 8:
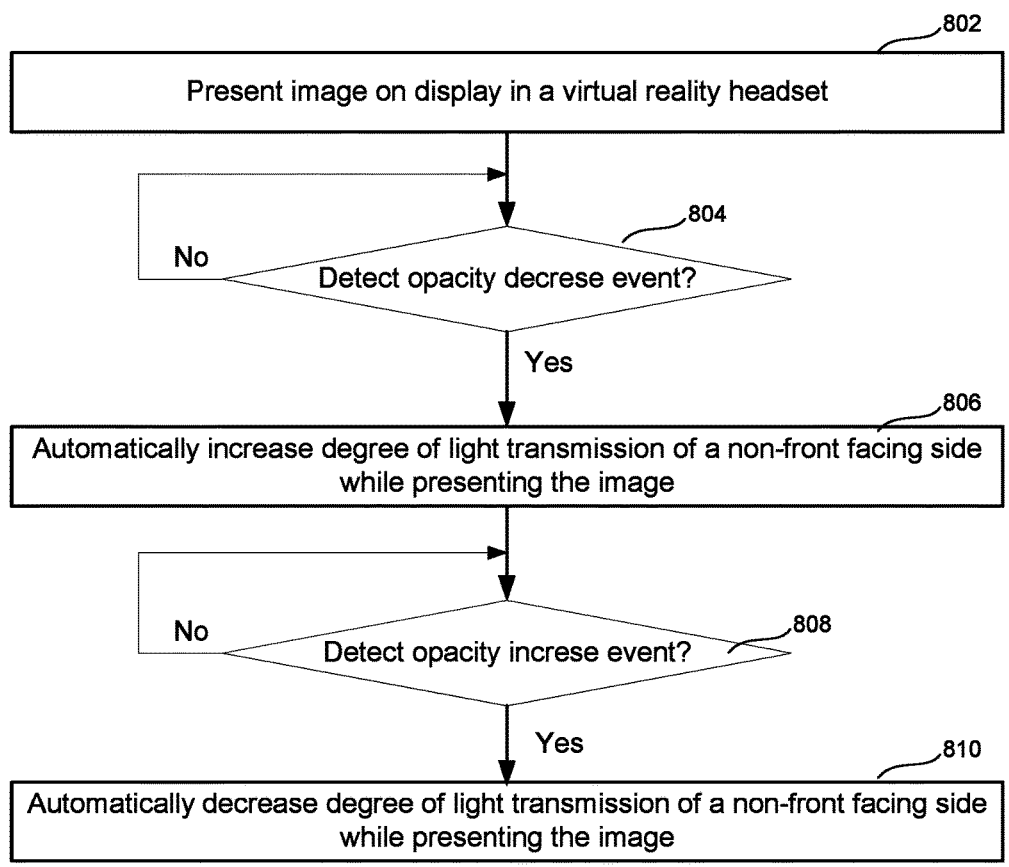
FIG. 8 is a flowchart of one embodiment of a process of operating a virtual reality headset system.

FIG. 8 is a flowchart of one embodiment of a process of operating a virtual reality headset system 8. The process may be implemented by any of the example virtual reality headsets disclosed herein, but is not limited to the specifically disclosed embodiments. Prior to the process, the virtual reality headset 2 may be in a mode in which the user's view to world outside of the headset 2 is obscured. In this mode the user is not able to clearly see details of objects in the world outside of the virtual reality headset. For example, the window 102 is in a mode in which the opacity is relatively high. This does not mean that the window is opaque. That is, it is not required that all light transmission from the outside world be blocked by the window 102. In one embodiment, the window 102 is in a translucent mode in which light passes through the window 102, but is scattered or diffused to such an extent that the user cannot clearly see details of objects in the real world.

Step 802 includes displaying an image in a virtual reality headset 2. In one embodiment, this is a stereographic image. For example, slightly different images are presented on the right display 104R and left display 104L to provide a stereo image to the user wearing the headset 2.

Step 804 includes a step to detect whether the opacity of the window 102 should be decreased. In other words, the virtual reality headset system 8 detects whether the light transmission of the window 102 should be increased. Step 804 may be performed in response to a wide variety of triggers. The virtual reality headset system 8 may monitor user actions to determine when to change the degree of light transmission. In some embodiments, the sensor 118 detects a user action that is interpreted as a request to decrease the opacity (or increase the light transmission).

In one embodiment, step 804 is triggered in response to an explicit user request to increase the light transmission of the window 102. The explicit user request may be provided by the user in a number of ways. For example, the user could speak a voice command, which is received by microphone 710. In one embodiment, the virtual reality headset 2 has a proximity sensor that is configured to detect the user making a gesture. For example, the user could make a physical gesture with their hand, which is received by outward facing camera 113. The user could make a physical gesture with a body part other than their hand, or with some physical object other than a body part. The proximity sensor can be implemented with a device other than a camera. In one embodiment, the sensor 118 is a capacitive sensor, which the user may touch, tap, swipe, etc. to generate a request to decrease the opacity.

Figure 9:
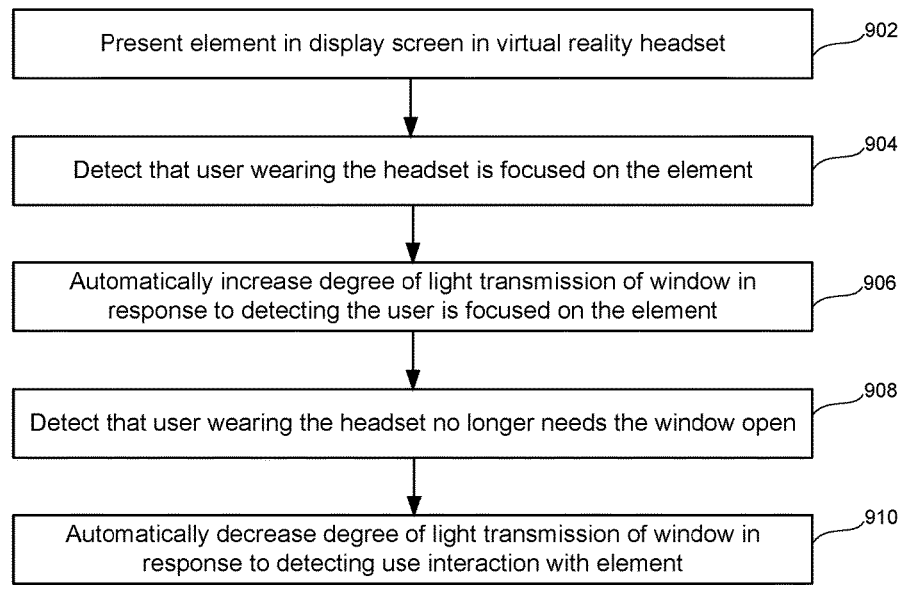
FIG. 9 is a flowchart of one embodiment of changing the opacity in response to detecting user interaction with an element being displayed in the virtual reality headset.
Figure 10:
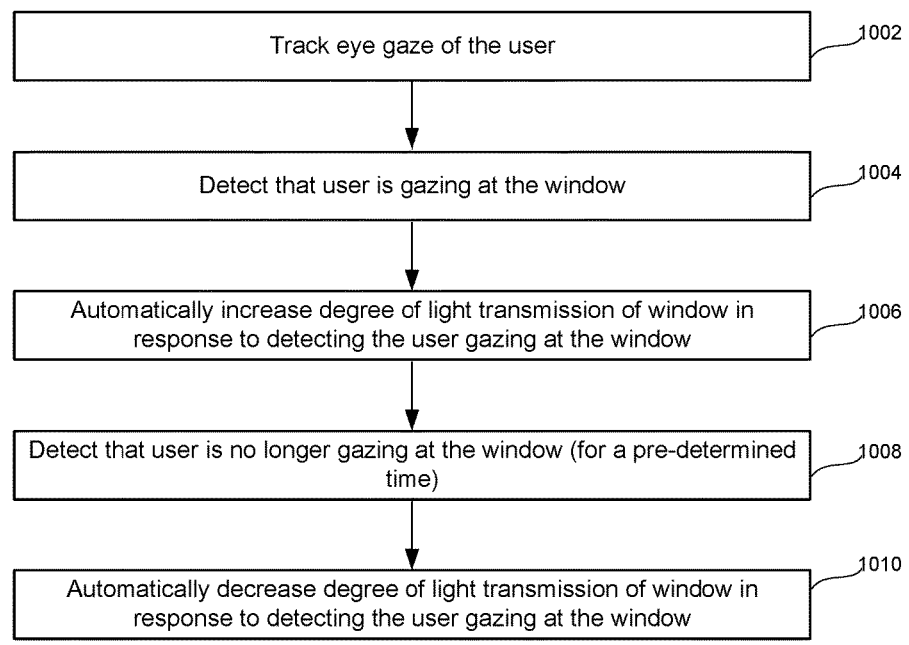
FIG. 10 is a flowchart of one embodiment in which the virtual reality headset automatically increases the degree of light transmission of the window based on tracking the user's eye gaze.

In some embodiments, the virtual reality headset system 8 determines that the opacity (or degree of light transmission) of the window 102 should be changed in response to user actions that are not an explicit command to change the mode. FIGS. 9 and 10, to be discussed below, depict embodiments in which an explicit command from the user to increase the light transmission is not required.

Step 806 includes automatically increasing the degree of light transmission (or decreasing opacity) of a non-front facing side (e.g., 108, 110, 112R, 112L) of the virtual reality headset 2 while presenting the image in the display. In some embodiments, control logic (e.g., opacity control 224) in the virtual reality headset system 8 provides an electrical signal (e.g., voltage) to the window 102 to decrease the opacity. In this manner, the user may be provided a view of the world outside of the virtual reality headset.

Step 806 may include increasing the degree of light transmission such that the user is able to clearly see details of objects in the world outside of the headset 2. This may be referred to as a transparent mode. It is possible for the window 102 to filter light of one or more ranges of frequencies, while passing light of one or more other ranges of frequencies in this transparent mode. For example, the window 102 could have a bluish tint to it in which the user is able to clearly see details of objects in the world outside of the headset 2. Step 806 may include changing a polarization of the window 102 such that the user is able to clearly see details of objects in the world outside of the headset 2. Note that the window 102 could scatter (or diffuse) the light to a small extent and still allow the user to clearly see details of objects in the world outside of the headset 2.

Step 808 includes a step to detect whether the opacity of the non-front facing side (e.g., window 102) should be increased. In other words, the virtual reality headset system 8 detects whether the light transmission of the window 102 should be decreased. Step 808 may be performed in response to a wide variety of triggers. The virtual reality headset system 8 may monitor user actions to determine when to change the degree of light transmission. In some embodiments, the sensor 118 detects a user action that is interpreted as a request to increase the opacity (or decrease the light transmission).

In one embodiment, step 808 is triggered in response to an explicit user request to decrease the light transmission of the window 102. The explicit user request may be provided by the user in a number of ways. For example, the user could speak a voice command, which is received by microphone 710. In one embodiment, the virtual reality headset 2 has a proximity sensor that is configured to detect the user making a gesture. For example, the user could make a physical gesture with their hand, which is received by outward facing camera 113. The user could make a physical gesture with a body part other than their hand, or with some physical object other than a body part. In one embodiment, the sensor 118 is a capacitive sensor, which the user may touch, tap, swipe, etc. to generate a request to decrease the opacity. As one example, the user could swipe the capacitive sensor (possible located in the window 102) in one direction to "open" the window 102 and another direction to "close" the window 102. By "open the window" it is meant that the opacity is decreased such that the user is able to clearly see into the world outside of the headset. By "close the window" it is meant that the opacity is increased such that the user is prevented from clearly seeing into the world outside of the headset.

FIG. 9 is a flowchart of one embodiment of changing the opacity of the window 102 in response to a virtual reality headset system 8 detecting user interaction with an element being displayed in the virtual reality headset 2. In step 902, an element is displayed on the display 104 of the virtual reality headset 2. As one example this the element has a field that requests some user input (e.g., user input field). For example, the element could be a login field that request a user ID, user password, etc.

Step 904 includes the virtual reality headset system 8 detecting that the user is focused on the element. For example, the virtual reality headset system 8 detects that the user is interacting with the element. Oftentimes a user will have a good sense of where an input device, such as a "computer mouse" is located even if the user cannot see the input device. Thus, even if the virtual reality headset 2 is in a mode (e.g., opaque mode) in which the user's view of the real world outside of the virtual reality headset 2 is completely blocked, the user may be able to locate and manipulate the user input device. The input device (e.g., computer mouse) may be used to drive (e.g., move) the location of a cursor that is displayed in the virtual reality headset 2. Thus, the user may be able to move the cursor such that it hovers over the element. In one embodiment, simply hovering the cursor over the element causes the virtual reality headset 2 to detect that the user is focused on (e.g., interacting with) the element. Hovering the cursor over the element means for the cursor to be stationary for a pre-determined amount of time. In one embodiment, the user can select the element by combining placing the cursor over the element and making a selection such as "clicking" on a button of the computer mouse.

Step 906 includes automatically increasing the degree of light transmission of the window 102 (which may be in one of the non-front facing sides 108, 110, 112R, 112L) in response to detecting user focus on (e.g., interaction with) the element. For example, the window 102 is placed into a transparent mode in which the user is able to clearly see details of objects in the world outside of the virtual reality headset.

Step 908 includes determining that the user no longer needs the window 102 open. In other words, the user no longer needs the window 102 to be in a mode in which a view of the world outside is available. Step 908 may include determining that the user is no longer focused on (e.g., interacting with) the element. For example, the user has filled in whatever fields (e.g., user ID, password, etc.) that are available or required.

Step 910 includes automatically decreasing the degree of light transmission of the window 102 in response to determining that the user no longer needs the window 102 open. For example, the window 102 is placed into either a translucent or an opaque mode in which the user is not able to clearly see details of objects in the world outside of the virtual reality headset.

FIG. 10 is a flowchart of one embodiment in which the virtual reality headset system 8 automatically increases the degree of light transmission of the window 102 based on tracking the user's eye gaze. Step 1002 includes the virtual reality headset system 8 tracking the user's eye gaze. The virtual reality headset system 8 may use the eye tracking illumination 134A and eye tracking camera 134B in step 1002.

Step 1004 includes the virtual reality headset system 8 detecting that the user is gazing at the window 102. This could indicate, for example, that the user is looking down towards a computer keyboard in the real world.

Step 1006 includes automatically increasing the degree of light transmission of the window 102 in response to detecting that the user is gazing at the window 102. For example, the window 102 is placed into a transparent mode in which the user is able to clearly see details of objects in the world outside of the virtual reality headset.

Step 1008 includes the virtual reality headset system 8 detecting that the user is no longer gazing at the window 102 for some pre-determined time. The pre-determined time may be established at any suitable length. The pre-determined time may be configurable by the user. In one embodiment, the window 102 "opens" and "closes" in response to the user gazing at and away from the window 102, respectively.

Step 1010 includes automatically decreasing the degree of light transmission of the window 102 in response to detecting that the user is no longer gazing at the window 102 for the pre-determined time. For example, the window 102 is placed into either a translucent or an opaque mode in which the user is not able to clearly see details of objects in the world outside of the virtual reality headset.

Figure 11:
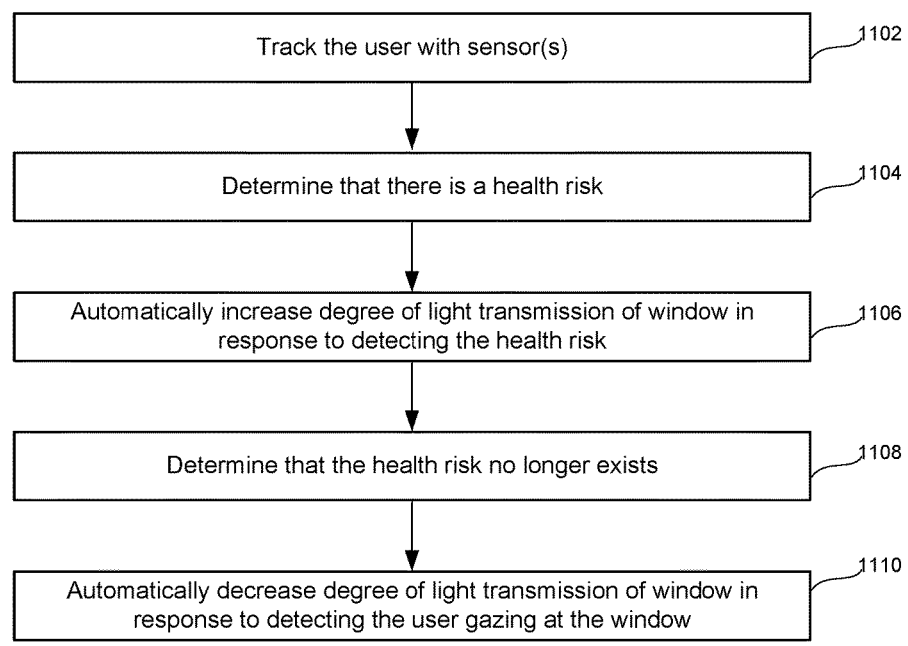
FIG. 11 is a flowchart of one embodiment in which the virtual reality headset automatically increases the degree of light transmission of the window based on determining a potential user health risk exists.

FIG. 11 is a flowchart of one embodiment in which the virtual reality headset system 8 automatically increases the degree of light transmission of the window 102 based on detecting a potential health risk to the user. Step 1102 includes the virtual reality headset system 8 tracking the user with one or more sensors. In one embodiment, the virtual reality headset system 8 tracks a biological signal, such as amount of pupil dilation, blood pressure or heart rate. In one embodiment, the virtual reality headset system 8 uses biological signal tracking 231 to track biological signals. In one embodiment, the virtual reality headset system 8 uses the eye tracking illumination 134A and eye tracking camera 134B, in step 1102.

Step 1104 includes the virtual reality headset system 8 determines that there is a health risk to the user, based on data collected in step 1102. In one embodiment, the system 8 determines there is a health risk in response to detecting dilation of the pupils of the user's eyes. This pupil dilation might suggest that the user is dizzy, of have some other type of health risk. In one embodiment, the system 8 determines there is a health risk in response to a blood pressure reading. This could be a sudden change in blood pressure (either a sudden increase or a sudden decrease), or that the blood pressure is above or below a value that demarcates a health risk. In one embodiment, the system 8 determines there is a health risk in response to the user's heart rate (e.g., a sudden change, an abnormal rhythm, the rate exceeding a high level indicating tachycardia, etc.). The system 8 might use a combination of data such as eye tracking, blood pressure, and/or heart rate to determine a health risk may exist.

Step 1106 includes automatically increasing the degree of light transmission of the window 102 in response to detecting that the user health risk. For example, the window 102 is placed into a transparent mode in which the user is able to clearly see details of objects in the world outside of the virtual reality headset.

Step 1108 includes the virtual reality headset system 8 determining that the health risk no longer exists. This may be based on analyses of the biological signals, express input from the user, etc.

Step 1110 includes automatically decreasing the degree of light transmission of the window 102 in response to determining that the health risk no longer exists. For example, the window 102 is placed into either a translucent or an opaque mode in which the user is not able to clearly see details of objects in the world outside of the virtual reality headset.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the present technology.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A virtual reality headset, comprising:
 a display configured to present an image to an eye of a user wearing the virtual reality headset;
 a casing partially surrounding the display, the casing having an opening configured to receive the user's face, the casing having a region between the display and the user's face configured to change opacity; and
 control logic configured to:
 track a biological signal of the user, and
 cause the region to decrease in opacity in response to determining a potential health risk to the user exists, based on the biological signal.

2. The virtual reality headset of claim 1, wherein the region is configured to automatically change the opacity in response to express input from the user to change the degree of opacity.

3. The virtual reality headset of claim 1, further comprising control logic configured to monitor actions of the user, wherein the control logic is configured to cause the region to change the opacity based on monitoring the user's actions.

4. The virtual reality headset of claim 1, wherein the region is configured to change its degree of opacity in response to an electrical signal.

5. The virtual reality headset of claim 1, wherein the region is not co-planar to a major surface of the display.

6. The virtual reality headset of claim 1, wherein a major surface of the region is angled at greater than 30 degrees with respect to a major surface of the display.

7. The virtual reality headset of claim 1, further comprising control logic configured to:
 display an element on the display;
 detect that the user is focused on the element; and
 cause the region to have a lesser degree of opacity in response to detecting that the user is focusing on the element.

8. The virtual reality headset of claim 7, wherein the element is a user input field.

9. The virtual reality headset of claim 1, wherein the region is configured to have a first mode in which the user is able to clearly see details of objects in the world outside of the virtual reality headset and a second mode in which the user is not able to clearly see details of objects in the world outside of the virtual reality headset.

10. The virtual reality headset of claim 1, wherein the region resides in a bottom side of the casing from the viewpoint of the user looking downward.

11. A method comprising:
 presenting an image on a display in a virtual reality headset, the virtual reality headset having a front facing side and one or more non-front facing sides adjoined to the front facing side, the one or more non-front facing sides forming an opening configured to receive a user's face, the display being aligned substantially parallel with the front facing side; and
 tracking a biological signal of the user and automatically increasing a degree of light transmission of a window in at least one of the one or more non-front facing sides while presenting the image in response to determining a potential health risk to the user exists, based on the biological signal, wherein the user is provided a view of the world outside of the virtual reality headset.

12. The method of claim 11, wherein automatically increasing a degree of light transmission of the window comprises:
 changing from a first mode in which the user is unable to clearly see details of objects in the world outside of the virtual reality headset to a second mode in which the user is able to clearly see details of objects in the world outside of the virtual reality headset.

13. The method of claim 11, further comprising:
 presenting an element in the display;

detecting that the user is interacting with the element, wherein the automatically increasing a degree of light transmission of the window is performed in response to detecting the user interacting with the element.

14. The method of claim 11, further comprising:
tracking an eye gaze of the user; and
detecting that the user is gazing at the window, wherein the automatically increasing a degree of light transmission of the window is performed in response to detecting the user is gazing at the window.

15. A head mounted display system, comprising:
a processor;
a display coupled to the processor, the processor configured to present an image to an eye of a user wearing the head mounted display; and
a casing having a front facing side and one or more lateral sides, the front facing side being substantially aligned with a plane in which the display resides, the one or more lateral sides forming an opening configured to receive the user's face, wherein at least one of the one or more lateral sides comprises a window configured to change a degree of light transmission from the world outside of the head mounted display, and wherein the processor is further configured to track a biological signal of the user and cause the window to provide a lower degree of light transmission from the world outside of the head mounted display in response to determining a potential health risk to the user exists, based on the biological signal.

16. The head mounted display system of claim 15, wherein the processor is configured to:
monitor actions of the user, wherein the processor is configured to cause the window to change the degree of light transmission from the outside world based on monitoring the user's actions.

17. The head mounted display system of claim 15, wherein the processor is configured to:
display an element on the display;
detect that the user is focused on the element; and
cause the window to provide a greater degree of light transmission from the outside world in response to detecting that the user is focusing on the element.

18. The head mounted display system of claim 15, wherein the processor is configured to:
track eye gaze of the user; and
cause the window to provide a greater degree of light transmission from the outside world in response to detecting that the user is focusing on the window.

19. The head mounted display system of claim 15, wherein the processor is configured to provide an electrical signal to the window to cause the window to change the degree of light transmission from the world outside of the head mounted display.

* * * * *